(12) United States Patent
Alcock et al.

(10) Patent No.: US 7,565,153 B2
(45) Date of Patent: Jul. 21, 2009

(54) METHOD AND SYSTEM FOR DELIVERY OF LOCATION SPECIFIC INFORMATION

(75) Inventors: William Guy Alcock, Indialantic, FL (US); Kenneth Martin Vitardebo, Satellite Beach, FL (US); Timothy Francis McWilliams, Melbourne, FL (US)

(73) Assignee: CML Emergency Services Inc., Gatineau, Quebec (CA)

( * ) Notice: Subject to any disclaimer, the term of this patent is extended or adjusted under 35 U.S.C. 154(b) by 646 days.

(21) Appl. No.: 10/348,693

(22) Filed: Jan. 22, 2003

(65) Prior Publication Data

US 2004/0198389 A1    Oct. 7, 2004

(51) Int. Cl.
*H04Q 7/20* (2006.01)
*H04M 3/42* (2006.01)

(52) U.S. Cl. .................. 455/456.1; 455/456.3; 725/32; 725/35

(58) Field of Classification Search .............. 455/414.1, 455/456.1, 466, 414.2, 456.2, 456.3, 557, 455/432, 517; 725/32–36
See application file for complete search history.

(56) References Cited

U.S. PATENT DOCUMENTS

| | | | |
|---|---|---|---|
| 4,897,642 A | 1/1990 | DiLullo et al. | |
| 5,121,430 A | 6/1992 | Ganzer et al. | |
| 5,260,986 A | 11/1993 | Pershan | |
| 5,278,539 A | 1/1994 | Lauterbach et al. | |
| 5,432,542 A * | 7/1995 | Thibadeau et al. | 725/35 |
| 5,436,965 A | 7/1995 | Grossman et al. | |
| 5,448,618 A | 9/1995 | Sandlerman | |
| 5,557,658 A | 9/1996 | Gregorek et al. | |
| 5,719,918 A | 2/1998 | Serbetciouglu et al. | |
| 5,875,404 A | 2/1999 | Messiet | |
| 5,930,717 A | 7/1999 | Yost et al. | |
| 5,978,460 A | 11/1999 | Butts et al. | |
| 6,021,177 A | 2/2000 | Allport | |
| 6,028,537 A | 2/2000 | Suman et al. | |
| 6,038,438 A | 3/2000 | Beeson et al. | |
| 6,084,510 A | 7/2000 | Lemelson et al. | |
| 6,097,938 A | 8/2000 | Paxson | |
| 6,104,931 A | 8/2000 | Havinis et al. | |
| 6,112,075 A | 8/2000 | Weiser | |
| 6,122,520 A | 9/2000 | Want et al. | |
| 6,167,266 A | 12/2000 | Havinis et al. | |
| 6,208,975 B1 | 3/2001 | Bull et al. | |
| 6,236,365 B1 | 5/2001 | LeBlanc et al. | |

(Continued)

*Primary Examiner*—Binh K Tieu
(74) *Attorney, Agent, or Firm*—Knobbe Martens Olson & Bear LLP

(57) ABSTRACT

A method and system for delivering location specific information to a receiver without the receiver having to transmit its location. The method includes self-determining a location of a receiver and receiving a signal comprising information pertaining to a wide geographical area. The method further includes selectively extracting, from the signal comprising information pertaining to a wide geographical area, geographic location specific information that only applies to a self-determined geographic location of the receiver. The method may also include broadcasting a signal to a wide geographic area, wherein information in the signal is tagged to specific geographic locations. The system includes at least one receiver comprising a locator for self-determination of geographic location and a discriminator for extracting appropriate location specific information. The system may also include a base station for broadcasting a signal comprising information pertaining to a wide geographic area, wherein the information comprises geographic location specific information.

37 Claims, 5 Drawing Sheets

U.S. PATENT DOCUMENTS

| | | | |
|---|---|---|---|
| 6,259,405 B1 | 7/2001 | Stewart et al. | |
| 6,266,612 B1 | 7/2001 | Dussell et al. | |
| 6,266,615 B1 | 7/2001 | Jim | |
| 6,295,449 B1 | 9/2001 | Westerlage et al. | |
| 6,308,132 B1 | 10/2001 | Wilson et al. | |
| 6,317,718 B1 | 11/2001 | Fano | |
| 6,347,216 B1 * | 2/2002 | Marko et al. | 455/12.1 |
| 6,349,257 B1 | 2/2002 | Liu et al. | |
| 6,356,761 B1 * | 3/2002 | Huttunen et al. | 455/456.1 |
| 6,397,054 B1 | 5/2002 | Hoirup et al. | |
| 6,397,076 B1 | 5/2002 | Brown et al. | |
| 6,463,273 B1 | 10/2002 | Day | |
| 6,509,833 B2 | 1/2003 | Tate | |
| 6,516,191 B1 * | 2/2003 | Greenspan et al. | 455/412.1 |
| 6,522,875 B1 * | 2/2003 | Dowling et al. | 455/414.3 |
| 6,556,664 B1 | 4/2003 | Langsenkamp | |
| 6,567,504 B1 | 5/2003 | Kercheval et al. | |
| 6,590,507 B2 | 7/2003 | Burns | |
| 6,621,900 B1 | 9/2003 | Rice | |
| 6,710,711 B2 | 3/2004 | Berry | |
| 6,724,861 B2 | 4/2004 | Newland et al. | |
| 6,731,940 B1 * | 5/2004 | Nagendran | 455/456.1 |
| 6,735,431 B1 * | 5/2004 | Tsunami et al. | 455/414.2 |
| 6,745,021 B1 | 6/2004 | Stevens | |
| 6,792,081 B1 | 9/2004 | Contractor | |
| 6,813,502 B2 * | 11/2004 | Son et al. | 455/456.3 |
| 6,816,878 B1 | 11/2004 | Zimmers et al. | |
| 6,819,919 B1 * | 11/2004 | Tanaka | 455/414.1 |
| 6,836,667 B1 * | 12/2004 | Smith, Jr. | 455/456.1 |
| 6,842,774 B1 | 1/2005 | Piccioni | |
| 6,882,708 B1 | 4/2005 | Bedingfield et al. | |
| 6,912,270 B1 | 6/2005 | Drury et al. | |
| 6,912,271 B1 | 6/2005 | Tuttle | |
| 6,947,754 B2 | 9/2005 | Ogasawara | |
| 2002/0054670 A1 | 5/2002 | Shtivelman | |
| 2002/0067806 A1 | 6/2002 | Rodriguez et al. | |
| 2002/0136381 A1 | 9/2002 | Shaffer et al. | |
| 2002/0178454 A1 | 11/2002 | Antoine et al. | |
| 2003/0069002 A1 * | 4/2003 | Hunter et al. | 455/404 |
| 2003/0100326 A1 | 5/2003 | Grube et al. | |
| 2004/0132467 A1 | 7/2004 | Hull et al. | |
| 2004/0192189 A1 | 9/2004 | Yuhara et al. | |
| 2004/0198389 A1 | 10/2004 | Alcock et al. | |
| 2004/0266938 A1 | 12/2004 | Adamczyk et al. | |
| 2005/0003797 A1 | 1/2005 | Baldwin | |
| 2005/0070247 A1 | 3/2005 | Larson et al. | |

* cited by examiner

METHOD AND SYSTEM FOR DELIVERY OF LOCATION SPECIFIC INFORMATION

FIELD OF THE INVENTION

The present invention relates generally to providing wireless information related to a specific location, and more particularly, to providing location specific information to discriminating receivers located at a specific location.

BACKGROUND OF THE INVENTION

Geographically related information such as weather, traffic, real estate listings, restaurant information, military weapons movement, base map upgrades, evacuation routes, and terrorist attack avoidance routes are among the types of information that may be delivered by wireless communication. Typically, however, this information needs to be tailored to specific geographic locations to be most useful to the receiver of the information. For example, anyone who is traveling by land, sea, air, by vehicle, or on foot requires geographic information to get from a starting point to their destination. This basic geographic information is available, for example, from a compass, a road atlas, or a chart. Electronic forms of geographic information are available from devices that indicate position, direction, velocity, and altitude. However, if additional information about a particular location is required, additional interaction is necessary. This is particularly inconvenient for the person engaged in operating a vehicle.

It is becoming increasingly common for individuals to carry various forms of devices for receiving such information. While a local radio broadcast is the most direct approach for transmitting localized information, hand held computing devices now allow individuals to receive and extract information available, for example, from the Internet. Such computer technology may take the form of a laptop computer with a wireless receiving device or a wide area network (WAN) enabled PDA, e.g., a Palm Pilot™, that can receive Internet broadcasts. However, the computer technology cannot easily distinguish whether the broadcasts are for local geographic areas or for a remote geographic location. As a result, the user must analyze the broadcast to determine if the information is applicable to the users current geographic location.

It is known for a receiver, such as a PDA, to obtain location specific information from a localized broadcaster, provided the receiver includes a geographic positioning system. One such method is disclosed in U.S. Pat. No. 6,122,520 that describes a receiver for determining a present location, transmitting location coordinates to a network, and receiving location information corresponding to the transmitted location coordinates. The problem with this type of scheme for obtaining location specific information is that the receiver must include a transmitter to transmit the receiver's location to a provider of customized location information. As a result, the receiver needs additional circuitry to provide transmitting capability. In addition, the receiver needs to provide considerably more power to enable transmission of location coordinates to a network. Consequently, a mobile, handheld receiver for obtaining customized location information will suffer from reduced operating times and require more frequent recharging or battery replacement compared to a receiver-only device. Furthermore, in applications such as military operations, it may be important to use receivers that do not need to transmit to help avoid detection of a receiver's position. Accordingly, a receiver-only device can provide stealth advantages over more easily detected receive/transmit devices.

A tailored information delivery scheme using a one-to-one (network to single device) method, wherein each device requests information from the network, suffers from the drawback of requiring the network to deliver an individualized stream of information to each device within a service area. This is true even if the information being requested, such as geographically relevant information, is identical for multiple devices in the broadcast area, at the same point in time. This is a bandwidth expensive and inefficient method to accomplish the delivery of the individualized information. Therefore, there exists a need to inexpensively and efficiently deliver, using a passive, one to many topology (one network to many receivers simultaneously), geographic specific information to multiple receivers within a network. Such a scheme would allow better network resource allocation and therefore, would be much less expensive and bandwidth efficient to operate for the network.

Accordingly, a need exists for a method and system for receiving location specific information that does not require transmitting location information to a provider of the location specific information. In addition, a need exists for a system that allows a receiver to determine its location and reject or accept broadcasted location information based on the receiver's location. Further, there is a need for a system that can distinguish between geographically remote or geographically local information, and provide a user with information that is geographically oriented.

SUMMARY OF THE INVENTION

Generally, the present invention fulfills the foregoing needs by providing in one aspect thereof, a method of receiving location specific information including determining a location of a receiver. The method also includes self-determining a geographic location of a receiver. The method further includes receiving a signal comprising information pertaining to a wide geographical area. The method also includes selectively extracting, from the signal comprising information pertaining to a wide geographical area, geographic location specific information that only applies to a self-determined geographic location of the receiver. The method may also include broadcasting a signal comprising information pertaining to a wide geographic area, wherein the information comprises geographic location specific information.

In another aspect thereof, the invention includes a system for receiving geographic location specific information. The system includes a receiving device for receiving a signal comprising information pertaining to a wide geographical area, wherein the information pertaining to a wide geographical area is transmit tagged according to specific geographic locations. The system further includes a locator, operably connected to the receiving device, for self-determining a geographic location of the receiving device and generating a receive tag corresponding to the geographic location of the receiving device. In addition, the system includes a discriminator, operably connected to the receiving device, for selectively extracting, from the signal comprising information pertaining to a wide geographical area, geographic location specific information having a transmit tag corresponding to the receive tag. The system may also include a base station for broadcasting a signal comprising information pertaining to a wide geographic area, wherein the information comprises geographic location specific information.

The present invention further provides, in another aspect thereof, a data distribution system for receiving location specific information. The data distribution system includes a receiving device for receiving a signal comprising information pertaining to a wide geographical area, wherein the information pertaining to a wide geographical area is transmit tagged according to specific geographic locations. The system further includes a locator, operably connected to the receiving device, for self-determining a geographic location of the receiving device and generating a receive tag corresponding to the geographic location of the receiving device. In addition, the system also includes a discriminator, operably connected to the receiving device, for selectively extracting, from the signal comprising information pertaining to a wide geographical area, geographic location specific information having a transmit tag corresponding to the receive tag. The data distribution system may also include a base station for encoding geographic location specific information with transmit tags and broadcasting a signal comprising information pertaining to a wide geographical area comprising geographic location information tagged to geographic location specific information.

BRIEF DESCRIPTION OF THE DRAWINGS

The features of the invention believed to be novel are specifically set forth in the appended claims. The features and advantages of the present invention will become apparent from the following detailed description of the invention when read with the accompanying drawings in which:

Figure 1:
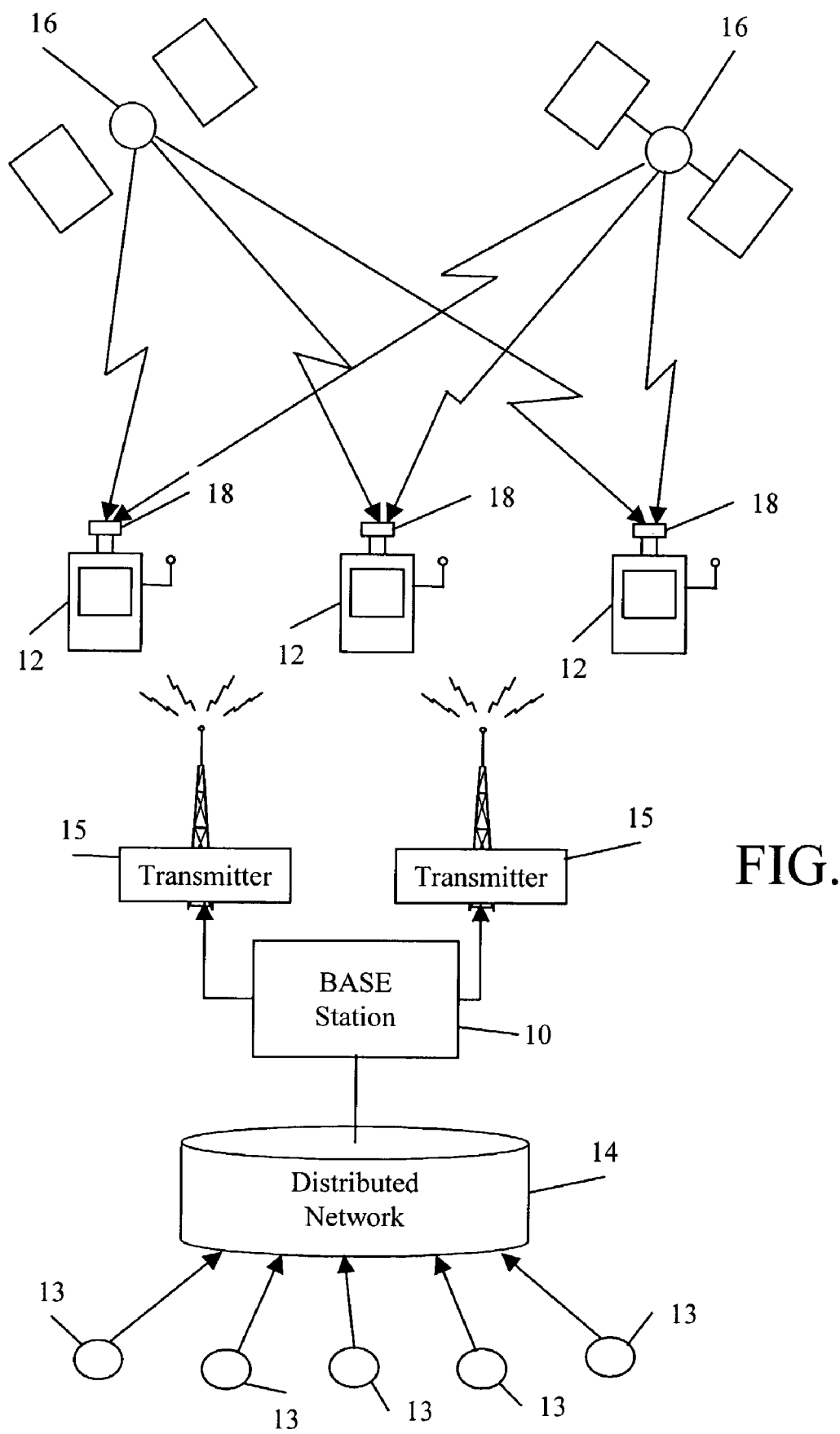
FIG. 1 is a block diagram representation of an exemplary embodiment of the invention including a base station and receivers.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 is a block diagram of an exemplary embodiment of the invention. Generally, the invention includes a base station 10, accessing information corresponding to specific locations culled from data sources 13 in a distributed network 14. The base station 10 can then provide the information to transmitters 15 broadcasting signals comprising location specific information to receivers 12. Advantageously, the information in the broadcast signal corresponding to a specific location is uniquely identified corresponding to a specific location for recognition by receivers 12 in the specific location. For example, a receiver 12 at a specific location will only process information uniquely identified as corresponding to the receiver's location. In an aspect of the invention, each receiver 12 includes a locator capable of independently determining the receiver's 12 location. For example, the locator may be a GPS receiver 18 for receiving signals from global positioning satellites 16 to determine a receiver's global position. In another aspect, the locator may work in conjunction with wireless communication antennas operating in a configuration using triangulation, signal angle and/or time delays to mathematically determine a receiver's location, such as an E911 system or loran type system. The receiver 12 may also include a discriminator to extract location specific information corresponding to the location of the receiver 12, as determined by the locator. Accordingly, once the locator has determined the receiver's location, the receiver 12 can receive and process signals broadcast by the transmitter 15 to extract only the information from the signal corresponding to the receiver's 12 location. The information may then be geographically linked to the receiver's location and the information may be displayed, for example, by overlay on a GPS based map display. Advantageously, the invention eliminates the need for a receiver 12 to transmit the receiver's location to a base station 10, thus allowing the base station 10 to provide geographically tailored information with reduced power requirements and reduced complexity of the receiver 12. Further, elimination of a transmitter in the receiver 12 reduces the risk of device detection because the receiver 12 operates passively, without emitting signals that might be detected by locating devices. In addition, the invention provides for efficient use of the network resources by eliminating in the need for a base station 10 to keep track of receivers 12 in a broadcast area and provide individualized information to each of the receivers in the broadcast area.

Figure 2:
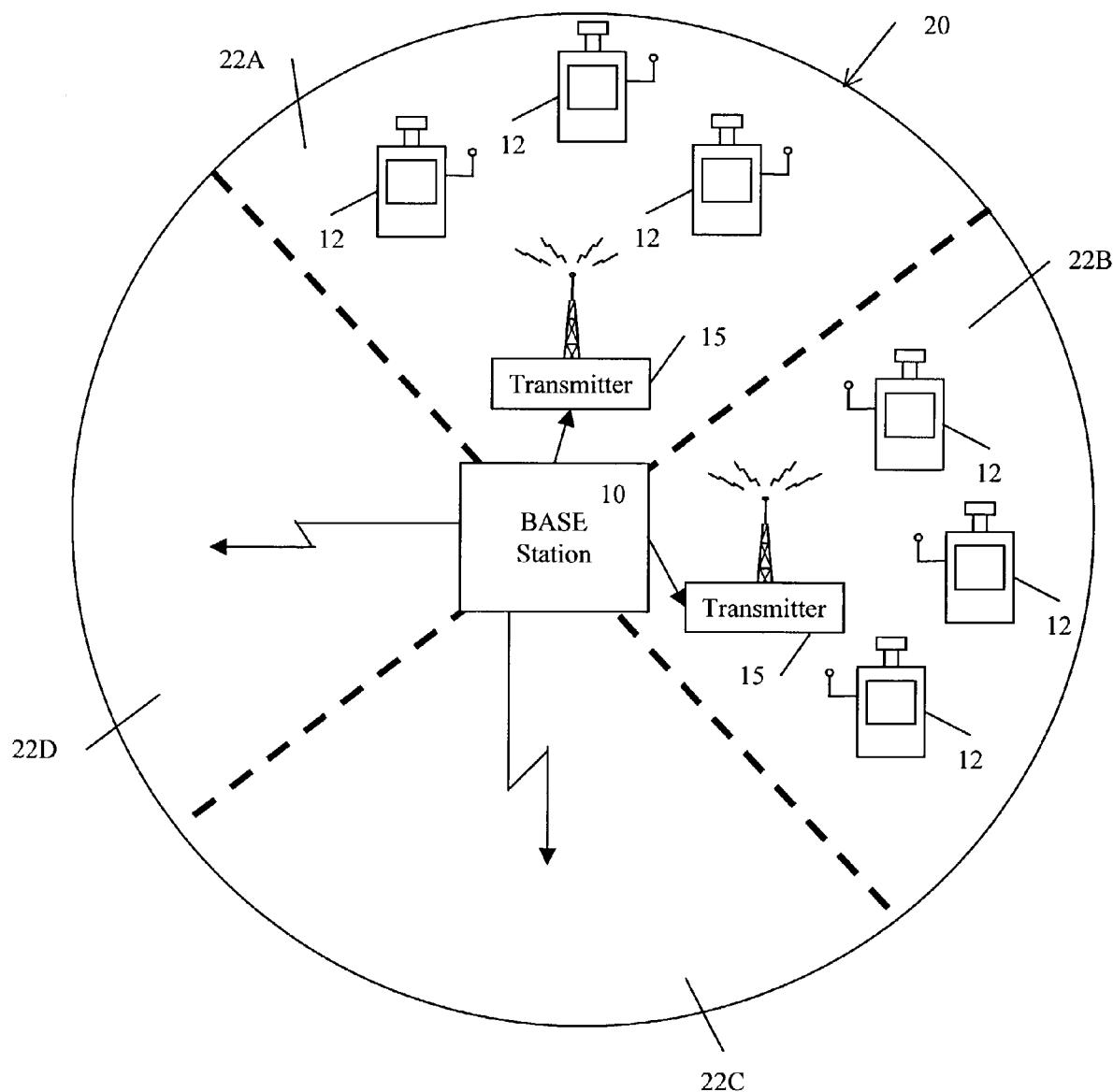
FIG. 2 is a diagram of sector broadcasting.

FIG. 2 is a diagram of sector broadcasting, wherein the base station 10 provides information to transmitters 15 located in respective sectors for broadcasting location information tailored to a respective sector in a broadcast area. Accordingly, a broadcast area 20 may be divided into multiple sectors 22A-22D. In an aspect of the invention, a portion of the information may be simultaneously broadcast across all sectors of the broadcast area 20 and another portion of the information may be broadcast over a limited number of sectors. In an aspect of the invention depicted in FIG. 2, the base station 10 broadcasts information in sectors 22A-22D of a broadcast area 20. Only information corresponding to locations within a sector 22A-22D are broadcast to that sector. As a result, receiver 12 in sector 22A receives information corresponding to locations within sector 22A, while receiver 12 in sector 22B only receives information corresponding to locations within sector 22B. While only four sectors are depicted in FIG. 2, it should be understood that the number of sectors used are limited only by the broadcast beam shaping capabilities of the transmitter 15. It should be understood that the maximum size of the sector is dependent only on the size of the broadcast area 20 and a broadcast area 10 consists of one or more sectors. By broadcasting data in sectors, the bandwidth requirement for sending all the necessary information across the entire broadcast area is greatly reduced. The base station 10 can provide relatively smaller amounts of customized data for each sector, thereby conserving bandwidth for each sector broadcast, compared to broadcasting all appropriate data over the entire broadcast area 20. In addition, the processing requirements for the receivers 12 are reduced because the receivers 12 only need to process the information for the sector they are in, not processing all the information for the entire broadcast area 20.

Figure 3:
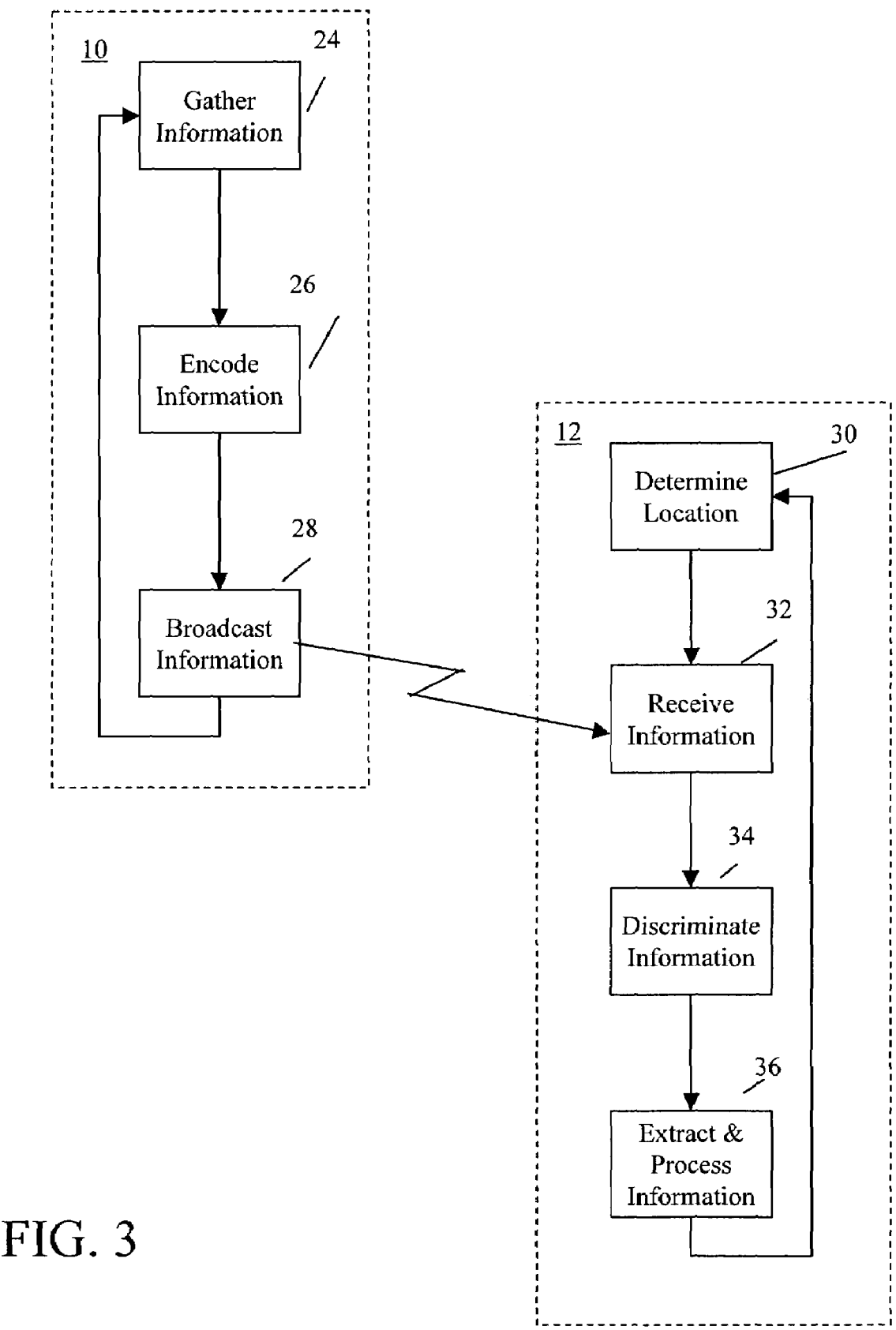
FIG. 3 is a flow chart illustrating the method of delivering location specific information.

FIG. 3 is a flow chart illustrating the method of delivering location specific information. The illustrated flow chart depicts the processes occurring in the base station 10, and each of the receivers 12 in communication with the base station 10 via transmitters 15. Initially, the base station 10 gathers information 24 corresponding to geographic locations within the base station's broadcast area 20. For example, the information may include roadmaps, traffic information, weather information, topographical maps, real estate listings, military troop movements, consumer pricing of goods and services or points of interest. The base station 10 may gather this information from a variety of sources, such as the Internet, geographic information system (GIS) databases, or National Oceanic and Atmospheric Administration (NOAA) data, using, for example, a distributed network 14. The base station 10 processes the gathered information to determine the relevant information to be broadcast.

In an aspect of the invention, the information may be subdivided into corresponding geographic sectors of the broadcast area. For example, the sectors may include pie shaped areas emanating from the location of the base station 10, wherein a portion of the information pertinent to locations within a given sector are broadcast to that sector and a portion of the information which may need to be available to all locations is broadcast to the entire broadcast area 20.

Once the information is gathered, the base station 10 encodes the information 26 so that each receiver 12 can recognize the information in a broadcast that is specific to each receiver's location. In an aspect of the invention, the location specific information and data having global significance can be encapsulated in a "packetized" format and transmitted over a large coverage area. In an aspect of the invention, each data packet of information transmitted by the base station 10 via transmitter 15 may include a "header" which will include a variety of information tags in addition to the location specific information broadcast. For example, a packet header may include tags such as: a subscription tag to identify a subscriber; a data type tag to identify the type of data in the packet; an authorization tag to validate and unlock a paid subscription; a security tag; a service level tag to identify the amount of information the receiver is authorized to accept; a delta tag to indicate the information is new or different information; a time stamp to indicate when the data was sent or the validation period; a sweep tag to identify the sweep number of the information being broadcast; a relevant location grid tag to identify the location; grid and sector for which the data is intended; and a unique device identifying code that allows data to be sent to a specific receiver so that the information can be easily recognized and processed by a receiver 12. For example, Internet-based information broadcast by a base station 10 via transmitter 15 may be provided with a header that can be analyzed by a receiving device to determine whether the broadcast information is for a remote or local application based on the present location of the receiver 12. Accordingly, the receiver 12 can quickly and efficiently distinguish between geographically remote or geographically local information in a broadcast, instead of having to process all the broadcast information received. Thus, the receiver can efficiently provide the user with information that is geographically appropriate by interpreting the header and tags.

In another aspect of the invention, the information may be encoded using a unique identifying tag, such as a transmit tag unique to a receiver. The base station 10 encodes information with the transmit tag according to the specific receiver for which the information is intended. For example, receiver 12, for which service subscription renewals have been paid, is contacted and provided a unique algorithmic authorization code to reset the receiver 12, so that the receiver 12 can begin processing, for example, all the information or a subset of the information based on the level of information service paid for. The tag may only be valid for a predetermined geographic location or a preset time period. If the receiver moves out of the predetermined geographic area, the receiver is unable to extract information. Similarly, if a subscriber's subscription to the service runs out, the receiver will no longer be able to extract information because the tag is no longer valid. In another aspect, the receiver 12 can receive information for a preset geographic area or based on a period of time or until another unique algorithmic authorization code is sent to terminate or modify the service. For example, a receiver 12 may be assigned a receive tag uniquely associated with the receiver 12. When the receiver 12 receives a signal with information having a transmit tag corresponding to the receiver's receive tag, that information is processed. As a result, a receiver 12 recognizes information tagged for the receiver 12 and ignores information not tagged for the receiver 12. Accordingly, unwanted information is quickly culled from the broadcast, leaving only the desired information to be processed.

After the information is encoded 26, the base station 10 broadcasts the information 28 to receivers 12 in the broadcast area via transmitters 15, located, for example, in the respective sectors. The broadcast cycle time may be varied according to the type of information broadcast. For example, weather and traffic information may need to be updated on a more frequent basis than restaurant information. In one aspect, broadcasts are sectorized so that only information corresponding to a geographic sector is broadcast to that sector. For example, the broadcast can operate analogous to a radar sweep, wherein sector appropriate information is broadcast as the base station sweeps over a sector of the broadcast area. By broadcasting only information corresponding to a specific sector, system bandwidth can be saved by eliminating the need to blanket the entire broadcast area with all the data, thereby reducing the processing requirements of receivers in each of the sectors. Once the information is broadcast to the broadcast area, the base station 10 returns to the step of gathering information 20 and the process is repeated.

In another aspect, the receiver may save received information and process only updated information. For example, information tags may include a delta code to indicate that the tagged information is new information and the device should process only the information tagged with the delta code, instead of the old information that has not changed since the last transmission sweep. The device may include RAM memory to store information until the next information update is received. This technique can reduce the bandwidth required by only requiring updates to be transmitted.

Figure 4:
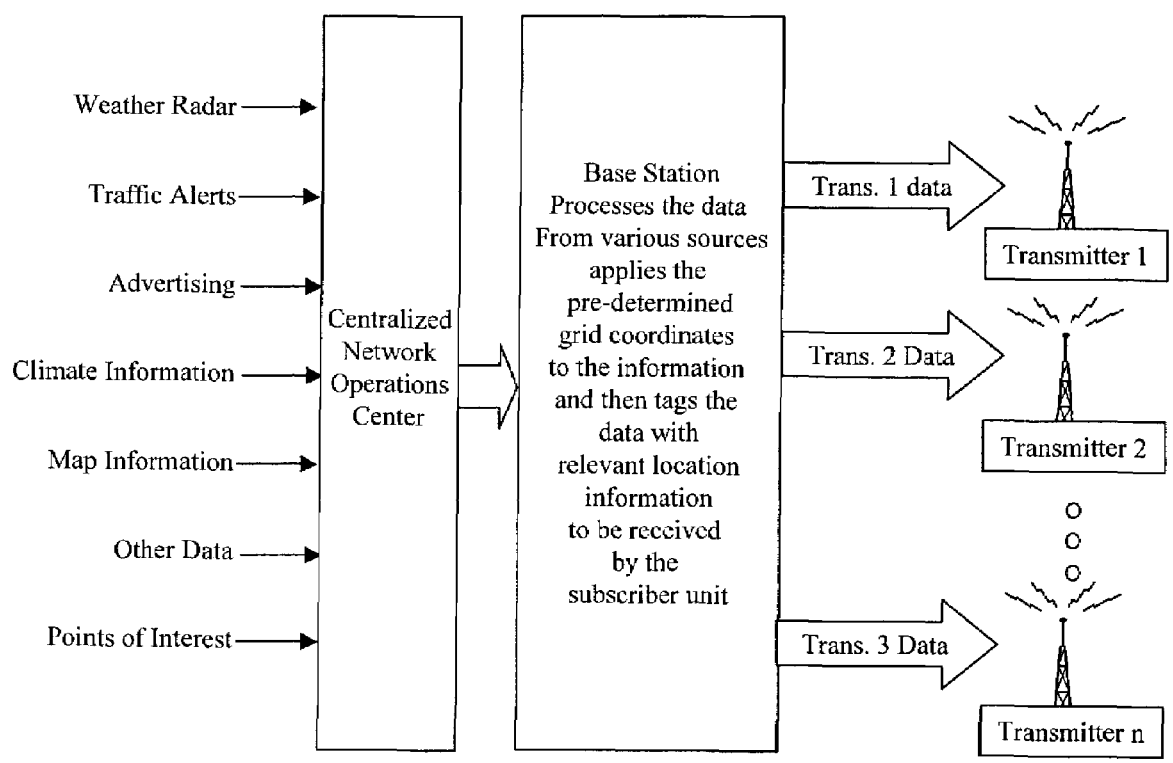
FIG. 4 is a diagram of illustrating operation of a network operations center.

In an aspect of the invention as shown in FIG. 4, a centralized network operations center (NOC) performs the task of gathering data and distributing the data to individual base stations. In one aspect, the data that is received by the network operations center is relative to a location, for example, a weather radar sweep for the state of Florida, wherein the center of the sweep and the radius of the sweep are known, so that the relevant location and area of the sweep is known. In another aspect, the data is tagged with a street address or other locations. With location specific advertising, for example, a particular restaurant may want potential patrons within a certain driving radius to be notified about the restaurant's special of the day.

The NOC computers compile data from the network in real-time and create a "big picture" view of the data. Then the data is formatted, including the location information, in a packetized format for delivery to individual base stations and broadcast, via transmitters, to the appropriate receivers in the broadcast area. In one aspect of the invention, only base stations relevant to the data are utilized. For example, information about the lunch special in a San Jose, Calif. restaurant would not be provided to a base station that covers Orlando, Fla. Similarly, traffic alert data for Oregon may not be provided to base stations broadcasting in New York. However, in another aspect, some, or all, information may be made available to all receivers in the broadcast area. For example, if a user located in Orlando, Fla. wanted the weather in San Jose, Calif., that information can be provided. In an embodiment, the NOC will broadcast the entire nation on a sweep basis and the receiver can accept this information and display it as requested. The Orlando user, for example, can place a cursor over San Jose, Calif. on the map display and the device will detect and filter the broadcast data to extract the appropriate information for San Jose, Calif. In this manner, a user is able to view, for example, weather conditions for any location broadcast by the NOC.

In yet another aspect of the invention, to minimize any delay in acquiring updated information, the receiver may include a "standby mode" wherein the receiver is always on in a low power receive mode for constantly receiving current information and saving it in memory. Accordingly, when the receiver is turned fully on, the most recently updated information, stored in memory, is instantly available on the screen, without delay in acquiring the updated information.

Another aspect of the invention is a user defined list of "favorite places" where the user may preset a list of geographic locations in memory. The receiver may incorporate multiple filters, running in a background mode, for simultaneously collecting detailed information on the selected favorite places. When the user selects one of these favorite places, the information corresponding to the selection is displayed without delay which would otherwise be inherent in waiting for the information sweep to deliver the information.

In yet another aspect, the invention may store historical information in memory, so that the user may replay that information for display on display screen of the receiver. The receiver may store location specific weather information so that storm movement can be tracked and displayed, for example, overlaid on a map display. Weather information for a specific geographic location may be stored over an extended time period so that the stored data may be "replayed" to graphically display the progress of a storm over time, shown in a replay mode.

In another aspect of the invention, multiple data transmission channels, wherein information is subdivided and transmitted simultaneously on different channels, may be used to increase the amount of information that can be transmitted, received, and processed simultaneously. In one embodiment, the information may be subdivided based on the intended broadcast sector. In another embodiment, the information may be subdivided based on the type of information. For example, if the transmission is accomplished over multiple satellite radio data channels, detailed weather information may be transmitted in one channel and updated at a comparatively faster rate, while detailed local information, such as localized product and service pricing may be transmitted on a different channel and updated at a comparatively slower rate. Accordingly, bandwidth can be conserved by using different channels so that the entire allocated bandwidth does not have to be used with each broadcast.

Turning now to the receiving process, receivers 12 in the broadcast area initially determine their geographic location 30 in the broadcast area. For example, the receivers 12 may be GPS enabled or incorporate E911 locator capability, such as in a cellular or PCS system, to provide location sensing. In another aspect of the invention, a user may program a desired location into the receiver 12 to enable receiving information corresponding to the programmed location. After the receiver's 12 location is determined 26, the receiver 12 receives information 32 from the base station 10. The received information is then discriminated 34, such as by analyzing tags attached to the information, to determine the location information specific to the receiver's 12 location. For example, the receiver 12 may read the header information of the broadcast information to determine which data in the broadcast is intended for the receiver's current location. In another aspect, the receiver may reject any broadcast not tagged for the current location of the receiver 12, and accept only the information that is tagged for the current location.

After the broadcast information is discriminated, the location specific information corresponding to the receiver's current location is extracted and processed 36 to display relevant information corresponding to the receiver's 12 location. For example, the system may process all the sector information in close proximity to the receiver 12 and less sector information farther away from the current location of the receiver 12, thereby providing a high level of detail in the local area, and less detailed information farther away from the device. The receiver 12 may also limit the information processed based on a viewing scale selected by a user. Once the information is processed, the receiver 12 returns to the step of determining the receiver's location 30 and the process is repeated.

Figure 5:
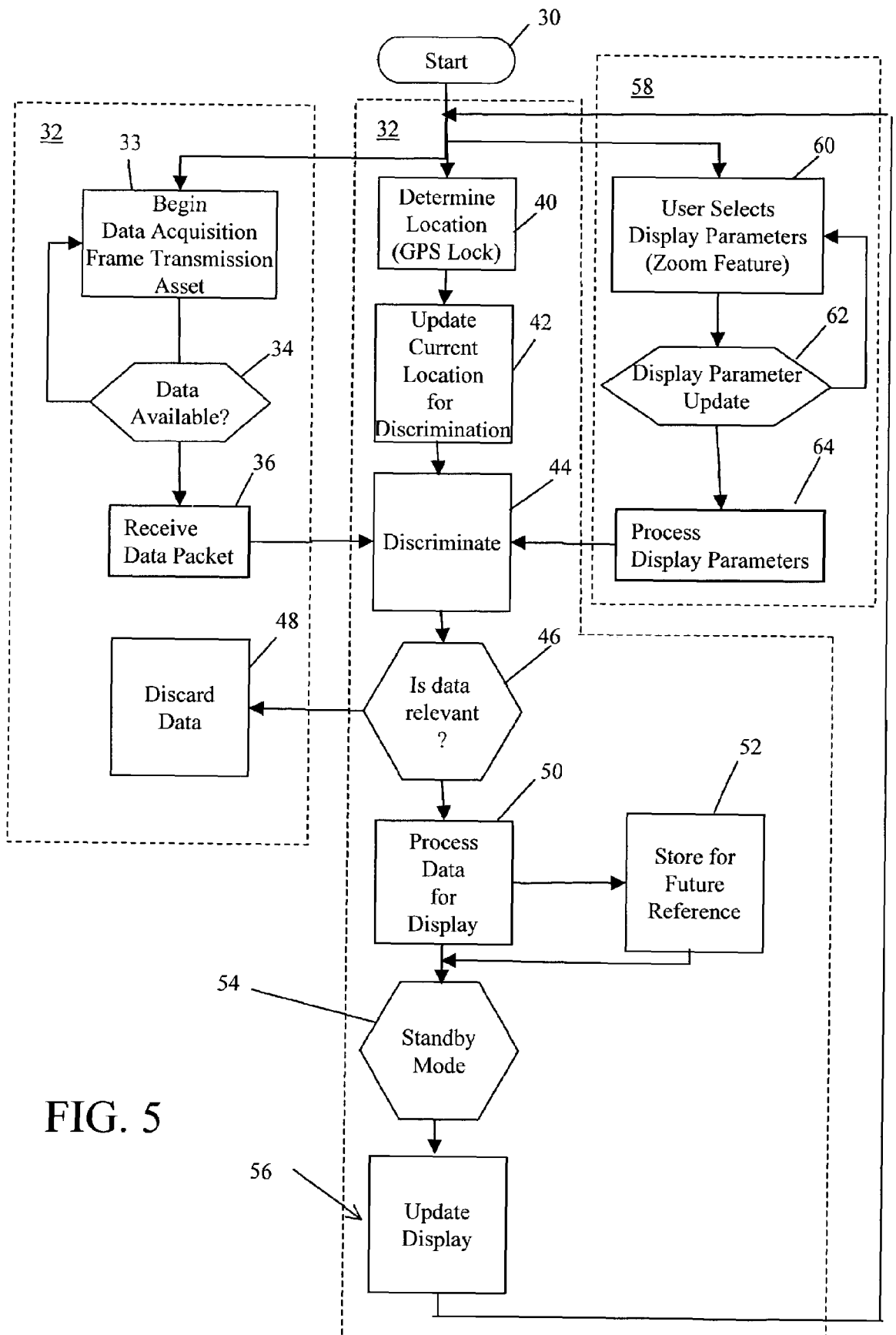
FIG. 5 is a flow chart illustrating a detailed method of receiving location specific information.

FIG. 5 is a flow chart illustrating a more detailed method of receiving location specific information. The process starts 40 when the receiver is activated by a user. Once the receiver is activated, the processes of receiving 32, processing 38, and user interfacing 58 can occur in parallel. The receiving process 32 acquires data broadcast from the base unit 33, and continues to acquire data as long as data is available 34. Concurrently, the data packets in the in the broadcast are received 36 and the received packets passed to a discrimination step 44 in the processing 38 flow.

The processing flow 38 starts by determining the receiver's location 40 and updating the current location for enabling discrimination 42 of incoming information. The received information (for example, in the form of data packets) from the receiving process 32 is discriminated 44 to determine if the incoming data is relevant 46 to the receiver's current location, or for example, to a selected location. If the data is not relevant, the information is discarded 48. If the data is relevant, the data is processed for display 50 or other indication, such as audible instructions. Concurrently, the data is stored (for example in non-volatile RAM) for future reference 52. Data stored in this manner may allow "instant zooming" of the display without having to reacquire information. The receiver then enters a standby mode 54 until the display (or oral indication) needs updating 56. After the display is updated, the process returns to determining the receiver's location in step 40 step.

During the receiving and processing processes, the user may control the receiver functions in the user interfacing 58 process, wherein a user selects display parameters 60, such as zoom features, and the receiver updates the display parameters 62 and continues to monitor user inputs. The selected display parameters are then processed 64 and provided to the discrimination step 44 in the processing flow 38, so that the receiver can discriminate according to the selected parameters, such as the current zoom or specific desired data. For example, a user may only want to view road map data along with traffic advisories. Conversely, the user may only want to view nautical chart data with the weather radar and climate information displayed. Manually selectable zooming capability allows a user to automatically scale the amount of processing required. In an aspect of the invention, a coarse view will always be accepted to allow the receiver to have something to be displayed. In another aspect of the invention, received data may be overlaid on a display or provided in a separate window portion or a linked screen of the receiver display. In another embodiment, the information may also be page-linked so the user can simply "page" through the relevant groups of information, analogous to changing channels on a TV. Each page can be set based on the zoom setting. For example, local residential real estate listings can be provided on one page, commercial real estate listings on another, and weather on yet another page. Each page may be overlaid on a base map for of ease of location reference.

All data receiving and processing will occur automatically. "Hand offs" from one base station to another base station are performed without operator intervention. As a user travels across the country, the user's location, and all relevant data, will be available and updated according to the user's current location.

Exemplary embodiments of the invention will now be described. To provide self-locating capabilities, the receiver may employ locating techniques such as GPS, Loran, Inertial Navigation, Direction Finding systems, or the like. In one embodiment, the invention is a wireless network including receivers that incorporate GPS capabilities, and such as PDAs, handheld computers or laptops. The receivers may also include cellular phones incorporating a E911 location capability. The receivers can be hand-held or mounted in a vehicle such as a boat, auto, farm equipment, golf cart, airplane, or the like, to receive the information. The received information will allow the user to view (or Filter) the relevant information at the location of the receiver. Alternately, the user can program the receiver for another location to receive information for that location.

The appropriate location specific information is collected from various sources and transmitted to the device via a wireless network. For example, over the air communication may include: satellite communications via a traditional communication link, traditional wireless communication technologies, such as WAN technologies; paging networks, either satellite or ground based; and cellular networks, such as PCS or analog systems, FM or other radio signals, satellite radio or a WiFi network. In geographically remote locations, satellite-based circuitry, such as within the Iridium System may be used.

As an example, an existing paging system offers one of the least expensive backbones for the current invention. Advantages to using existing paging infrastructure to implement the invention include lower cost circuitry, lower delivery cost, and smaller antenna requirements. Each paging device typically incorporates a unique Capcode or tag that allows the pager to "hear" or filter only those pages intended for the pager with that matching Capcode. All pagers in the area of the message broadcast actually receive the page, but in the case where the Capcode doesn't match a pager's unique Capcode, the pager does not process the page. This type of system may be used to implement the current invention by incorporating a header that may contain tags including a location tag in replacement of the Capcode.

For example, weather information may be parsed, packetized, and assigned a header with a location tag instead of a Capcode. The paging network or base station, would broadcast this information as a page, such as in the form of page including a header, with a location tag replacing the Capcode, and the weather data for that location.

The paging network may broadcast this information sector by sector while sweeping over the entire broadcast area. The broadcast cycle may also vary based on the underlying weather conditions. The receivers may process the pages based on the header tag identifying the sector that are appropriate to each receiver's current location. The receiver identifies its location, for example, from a connected GPS device. The weather-related information may provide a graphical real-time display of a weather radar scan for a particular geographic area, a weather forecast for a specific area, real estate listings, geographically relevant product and service advertisements or other geographically relevant information. Accordingly, the receiver culls inappropriate information and processes sector specific information corresponding to the receiver's sector location in the broadcast area.

In an embodiment, the receivers may process all the sectors in close proximity to the receiver and fewer sectors farther away from the current location of the receiver, thereby allowing a high level of detail in the local area and less detail farther away from the current location of the receiver. In another embodiment, the self-determining capability may be overridden to allow input of a desired geographic location. Accordingly, a desired geographic location can be selected and the receiver will extract the appropriate geographic location specific information corresponding to the selected location from a broadcast signal. For example, a user in one location may be able to override that self-determined location and retrieve geographic specific location information for different desired location by inputting the desired location in the receiver. The receiver then receives a broadcast containing geographic specific information for the desired location, extracts the information, and then displays the graphical weather radar sweep or other geographical relevant information, such as by overlaying the information onto a GPS map. For example, a user in one city may be traveling to a destination city 30 miles away and may wish to see information related to the destination city. By inputting the desired destination location, the information for that city is received, extracted, and displayed. In one embodiment, the information may be synchronized to the location of the user so that as the user drives towards the destination city, the information is updated appropriately.

In another aspect of the invention, security algorithms may be used to prevent unauthorized monitoring of the broadcast information. In yet another aspect, location appropriate location information may be overlaid on a display of the receiver, or displayed on a separate page, but still linked to the receiver's actual or programmed location. In still another aspect, two-way communication may also be provided in the receiver to allow transmitting of information.

Furthermore, advertising may be included with the information and, in particular, location specific advertising such as for restaurants or shopping. The location specific information can be coupled with "coupons" or advertised specials based on time and location of the merchants. "Cheap gas" could be displayed for a cross country venture so that the relative cheapest price of gasoline in a 50 mile radius is displayed for the intended route to allow the traveler ample time to take advantage of the appropriate exit to get the best deal. The invention may automatically provide a continuously updated route to the nearest cheapest gas.

In yet another aspect of the invention, map displays on the receiver are updated automatically whenever information for a specific geographic location is received and extracted. Accordingly, this dynamic updating obviates the need for maintaining maps, such as by DVD or removable memory device, in the receiver. Updates are provided automatically as updated information is broadcast to the receiver.

While only certain preferred features of the invention have been shown by way of illustration, many modifications and changes will occur to those skilled in the art. It is, therefore, to be understood that the present claims are intended to cover all such modifications and changes, which fall within the true spirit of the invention.

What is claimed is:

1. A method of receiving location specific information comprising:
   self-determining a discrete geographic location of a receiver;
   receiving a broadly transmitted signal comprising information pertaining to a wide geographical area;
   configuring the base station to identify at least one of the sectors of the base station that transmits to an area that overlaps the wide geographical area,
   wherein the base station comprising a plurality of sectors is configured to transmit signals to the receiving device,
   wherein the base station is configured to transmit the signal only via the at least one identified sector; and
   selectively extracting, from the signal comprising information pertaining to one or more discrete geographic locations within the wide geographical area, geographic location specific information that only applies to the discrete geographic location self-determined by the receiver.

2. The method of claim 1, further comprising receiving a signal wherein geographic location specific information within the information pertaining to a wide geographic area is tagged to identify respective geographic locations.

3. The method of claim 2, further comprising discriminating the signal comprising information pertaining to a wide geographical area according to the self-determined discrete geographic location of the receiver and an assigned tag.

4. The method of claim 1, further comprising distinguishing between geographic location specific information that is geographically remote, and geographic location specific information that is geographically local to the self-determined discrete geographic location of the receiver.

5. The method of claim 1, further comprising processing the information pertaining to a wide geographical area to extract geographic location specific information associated with the self-determined discrete geographic location according to a selected viewing scale.

6. The method of claim 1, further comprising:
   overriding a self-determined discrete geographic location of a receiver; and
   accepting a desired geographic location input to allow receiving and extracting of geographic location specific information corresponding to the desired geographic location input.

7. The method of claim 6, further comprising selectively extracting, from the signal comprising information pertaining to a wide geographical area, geographic location specific information that only applies to a desired geographic location input.

8. The method of claim 7, further comprising processing the information pertaining to a wide geographical area to extract geographic location specific information associated with the desired geographic location input according to a selected viewing scale.

9. The method of claim 1, further comprising receiving and extracting advertising information linked to a specific location in the signal comprising location specific information.

10. The method of claim 1, further comprising transmitting information from the receiver.

11. The method of claim 1, further comprising receiving and extracting updated geographic location specific information to continually refresh previously stored geographic location specific information.

12. The method of claim 11, further comprising receiving and extracting updated geographic location specific information for a plurality of selected locations to continually refresh previously stored geographic location specific information for each of the respective selected locations.

13. The method of claim 1, further comprising storing extracted geographic location specific information to allow selective replay of the extracted geographic location specific information.

14. The method of claim 1, further comprising overlaying geographic location specific information extracted from the signal comprising information pertaining to a wide geographic area on a receiver map display corresponding to a self-determined geographic location of a receiver.

15. The method of claim 1, further comprising gathering information related to specific geographic locations.

16. The method of claim 1 further comprising broadcasting a signal comprising information pertaining to a wide geographic area, wherein the information comprises geographic location specific information.

17. The method of claim 16, further comprising distributing information related to specific geographic locations in a wide geographical broadcast area to at least one transmitter broadcasting in the corresponding wide geographical broadcast area.

18. The method of claim 16, further comprising assigning tags, identifying a respective geographic location, to the geographic location specific information within the information pertaining to a wide geographic area.

19. The method of claim 16, wherein the tags are only valid for a predetermined geographic location.

20. The method of claim 16, wherein the tags are only valid for a predetermined time period.

21. The method of claim 16, further comprising including advertising information linked to a specific geographic location in the signal comprising information pertaining to a wide geographic.

22. The method of claim 16, wherein a first portion of the information pertaining to a wide geographic area is broadcast across an entire broadcast area and a second portion of the information pertaining to a wide geographic area is simultaneously broadcast over less than an entire broadcast area.

23. The method of claim 1, further comprising broadcasting, to a respective geographic sector of a wide geographical broadcast area, only geographic location specific information corresponding to the respective geographic sector.

24. The method of claim 23, further comprising assigning tags, identifying a respective geographic location, to the geographic location specific information corresponding to the respective geographic sector.

25. The method of claim 1, further comprising subdividing information related to geographic locations and broadcasting subdivided information simultaneously on separate transmission channels.

26. The method of claim 25, wherein the subdivided information broadcast on a respective transmission channel is updated at a different rate than information simultaneously broadcast on a different channel.

27. A system configured to deliver location specific information comprising:
   a receiver configured to receive a signal comprising information pertaining to a wide geographical area;
   a locator, operably connected to the receiver, configured to self-determine a geographic location of the receiver;
   a discriminator, operably connected to the receiver, configured to selectively extract, from the signal comprising information pertaining to a wide geographical area, geographic location specific information that only applies to a self-determined geographic location of the receiver; and a base station having a plurality of sectors configured to transmit signals to the receiving device and wherein the base station is configured to identify at least one of the sectors of the base station that transmits to an area that overlaps the wide geographical area, wherein the base station is configured to transmit the signal only via the at least one identified sector.

28. The system of claim 27, wherein the locator is a GPS receiver.

29. The system of claim 27, further comprising an override to allow input of a desired geographic location input for extracting geographic location specific information corresponding to the desired geographic location input.

30. The system of claim 27, further comprising a base station for broadcasting a signal comprising information pertaining to a wide geographic area, wherein the information comprises geographic location specific information.

31. The system of claim 30 wherein the base station further comprises an encoder for assigning tags, to identify geographic location specific information in the signal comprising information pertaining to a wide geographic area.

32. The system of claim 27, further comprising a centralized network operations center for gathering geographic location specific information for a wide geographic area and distributing the information to at least one base station broadcasting to a respective wide geographic area.

33. A data distribution system configured to receive geographic location specific information comprising:

a receiving device configured to receive a signal comprising information pertaining to a wide geographical area, wherein the information pertaining to a wide geographical area is transmit tagged according to specific geographic locations;

a base station having a plurality of sectors configured to transmit signals to the receiving device and wherein the base station is configured to identify at least one of the sectors of the base station that transmits to an area that overlaps the wide geographical area, wherein the base station is configured to transmit the signal only via the at least one identified sector;

a locator, operably connected to the receiving device, configured to self-determine a geographic location of the receiving device and generating a receive tag corresponding to the geographic location of the receiving device;

a discriminator, operably connected to the receiving device, configured to selectively extract, from the signal comprising information pertaining to a wide geographical area, geographic location specific information having a transmit tag corresponding to the receive tag; and an output connected to the receiving device configured to output the selectively extracted geographically selected information.

34. The data distribution system of claim 33, wherein the locator changes the receive tag according to a self-determined location of the receiving device.

35. The data distribution system of claim 33, wherein the receiving device is a paging device and the signal comprising information pertaining to a wide geographical area is a paging-type signal.

36. The system of claim 33, further comprising an override to allow input of a desired geographic location input for extracting geographic location specific information corresponding to the desired geographic location input.

37. The data distribution system of claim 33, further comprising a base station for encoding geographic location specific information with transmit tags and broadcasting a signal comprising information pertaining to a wide geographical area comprising geographic location information tagged to geographic location specific information.

* * * * *

UNITED STATES PATENT AND TRADEMARK OFFICE
CERTIFICATE OF CORRECTION

| | | |
|---|---|---|
| PATENT NO. | : 7,565,153 B2 | Page 1 of 1 |
| APPLICATION NO. | : 10/348693 | |
| DATED | : July 21, 2009 | |
| INVENTOR(S) | : William Guy Alcock et al. | |

It is certified that error appears in the above-identified patent and that said Letters Patent is hereby corrected as shown below:

Title page, column 1 item 73 (Assignee), which reads, "CML Emergency Services Inc., Gatineau, Quebec (CA)" should read -- Plant Equipment Inc. dba PlantCML, Temecula, California (US) --

Signed and Sealed this

Second Day of February, 2010

David J. Kappos
*Director of the United States Patent and Trademark Office*